106-97. AU 116 EX
8-7-73 XR 3,751,275

United States Patent [19]
Oken

[11] 3,751,275
[45] Aug. 7, 1973

[54] INORGANIC PROTECTIVE COATINGS

[76] Inventor: Aaron Oken, 805 E. Matson Run, Wilmington, Del. 19802

[22] Filed: Jan. 26, 1971

[21] Appl. No.: 109,935

[52] U.S. Cl............................ 106/90, 106/97, 106/104
[51] Int. Cl..................................................... C04b 7/02
[58] Field of Search ................... 106/76, 84, 90, 97, 106/104, 111, 287 SE

[56] References Cited
UNITED STATES PATENTS

| | | | |
|---|---|---|---|
| 2,968,571 | 1/1961 | Lantz | 106/287 SE |
| 2,550,923 | 5/1951 | Hackford et al. | 106/287 SE |
| 1,719,210 | 7/1929 | Burn | 106/76 |

FOREIGN PATENTS OR APPLICATIONS

| | | | |
|---|---|---|---|
| 154,835 | 12/1948 | Australia | 106/287 SE |

*Primary Examiner*—James E. Poer
*Attorney*—C. Walter Mortenson

[57] ABSTRACT

New compositions of matter are provided which are substantially inorganic in composition and which are strongly resistive to deterioration by the action of light, air and/or water. The compositions are anhydrous mixtures of a silicate ester and a hydraulic cement, and such mixtures may contain a catalyst. The silicate ester may be an ethyl polysilicate and the moisture reactive filler may be a material such as portland cement. The alkaline catalyst may be a material such as an alkali metal alkoxide. The ingredients are uniformly blended and in use the mixture is exposed to air in the form desired, usually a thin coating. Upon exposure to the moisture in air, drying occurs with the formation of very hard finishes which are highly crack resistant.

11 Claims, No Drawings

INORGANIC PROTECTIVE COATINGS

Since conventional organic coatings, which are degraded by light, oxygen and water, provide only a few years of protection to steelwork, there has been a continuing interest in protecting metal with an inorganic coating which would be unaffected by these degradative agents. However, to date only a very limited success has been achieved. For example, the process of porcelain enamelling is used to apply a glass-like coating on sheet steel, but this high temperature fusion technique is very limited in its application. Along the same line, many proposals have been made to use soluble silicates as inorganic paint vehicles, and, in the case of zinc-rich paints, this type of coating has enjoyed some success. In general, however, coatings based on soluble silicates suffer from two disadvantages: first, they are difficult to formulate, since the silicate solution reacts with many common pigments or fillers to precipitate insoluble silicates, and second, after they are applied, the soluble silicates must be insolubilized by either an acidic post-treatment or by baking.

It has been proposed that these difficulties with soluble silicates can be avoided by using a silicate ester as a paint vehicle, but this causes other serious difficulties. The conversion of silicate esters to silica by reaction with moisture is accompanied by a substantial contraction in film volume which causes film cracking and, at times, peeling of the coating from the steel substrate. Thus, there is a need for an inorganic protective coating for use on steel that does not crack or peel.

Accordingly, an objective of this invention is the provision of an inorganic protective coating that does not contract substantially during the formation of films using the material. Another aim is providing a coating material that adheres well to steel without peeling upon long exposures to the elements. A still further goal is forming a mixture of materials which adheres tenaciously to rusty steel and prevents a further rusting. These and other objectives will appear hereinafter.

It has now been found by this invention that shrinking and cracking of ethyl silicate based coatings is overcome by adding to their formulations a moisture reactive inorganic material such as portland cement or calcium aluminate cement. For example, in a zinc-rich coating formulated with ethyl silicate which normally shows severe cracking, the replacement of 10% of the zinc by portland cement leads to coatings in which cracking is completely eliminated.

An even more surprising effect is observed when the filler is composed largely or even entirely of such moisture reactive material. In this case, when the amount of filler is 50–95% of the total weight of the solids in the film, the resulting cured film is extremely hard, impervious to moisture, and, most surprising, is tenaciously adherent to rusty steel. Examination of the metal-coating interface shows that the rust originally present on the metal is no longer identifiable as such and seems to have been chemically incorporated into the cured coating. In any event, the coated metal shows no further evidence of rusting even on prolonged exposure to salt water. This quality of complete film integrity and tenacious adhesion to metal is not observed when moisture-inert fillers of the prior art are used with the silicate binder.

The elements of this invention comprise an anhydrous mixture of the following: a binder based on a silicate or preferably a polysilicate ester such as ethyl polysilicate (Ethyl silicate "40" of commerce) and a hydraulic cement such as portland cement. The addition of an alkaline catalyst is optional. In a typical formulation, the alkaline catalyst may be present in the range of 0.1% to 10% by weight based on the weight of ethyl polysilicate but the preferred range is 0.5% to 5%. Within this concentration range, rapid cure of the coating occurs under any condition of temperature and humidity likely to be encountered in practice. The alkaline catalyst can be an aliphatic or alicyclic primary, secondary or tertiary amine which has a $pK_a$ greater than 7 such as ethanolamine, diethanolamine, triethanolamine, dicyclohexylamine, morpholine or piperidine, or hydroxides or alkoxides of the alkaline or alkaline-earth metals such as sodium hydroxide, sodium methoxide, potassium hydroxide, potassium ethoxide, lithium hydroxide or barium hydroxide. However, since these latter materials are not soluble in ethyl polysilicate, they are much more effective catalysts if they are introduced as a solution in alcohols such as methanol or ethanol. In such solutions the active catalyst is probably the metal alkoxide. Since the curing of the ethyl polysilicate coating liberates ethanol, it is likely that even if metal hydroxides are used in the formulation, the corresponding ethoxide is probably formed in the course of the curing reaction and is probably responsible for most of the cure. The addition of a catalyst is not essential, for given sufficient time the anhydrous mixture of the silicate ester and the moisture reactive inorganic filler will harden on exposure to moisture. A catalyst is preferred, however, as it hastens the cure.

The moisture reactive inorganic material usually is a hydraulic cement, such as portland cement or calcium aluminate cement. Both of these materials are known to react with water to form a mat of acicular crystals which interlock to give hydrated cement or concrete. The moisture reactive inorganic filler may also be such a material as plaster of Paris. In short, the curing of the coating involves not only the conversion of polysilicate ester to silica, but also involves the transformation of the filler into a concrete-like product. It seems likely that the strength and rigidity of this hydrated material or cement restricts the film contraction which accompanies the conversion of polysilicate to silica and so reduces the tendency toward film cracking. Furthermore, it seems reasonable that the extremely hard, dense, fully cured coating owes much of its character to the component of hydrated material or cement, since nothing like these film properties has been observed with inert fillers such as clay, talc, mica, titanium dioxide, silicon dioxide or aluminum oxide.

The proportions of cementitious filler to the total solids can vary widely. When used as the sole filler, a weight of cement of 50–95% of total film solids gives a range of useful coatings but the preferred range would fall between 75–90% cement. When coatings are formulated with a mixture of fillers, such as zinc-dust and cement, 5–25% of cement in the filler component, which may amount to 70–95% of the total solids, will give a marked improvement or even complete elimination of the shrinkage cracking generally observed in its absence. Based on the total weight of the material in the mixture of the polysilicate and the hydraulic cement, the moisture reactive inorganic filler constitutes from about 25% to about 90% of said weight, the preferred range being about 50% to about 80%.

In summary, the addition of cement to silicate coatings produces much denser, harder, more adherent coatings than is possible in silicate coatings containing conventional fillers, and allows the formulation of practical inorganic paints.

The invention will be further understood by reference to the following description and examples, all of which is given for illustrative purposes only and in which parts and percentages are by weight unless otherwise indicated.

EXAMPLE 1

A mixture of ethyl silicate "40" (a polysilicate ester containing 40% silica) (125 parts), zinc dust (550 parts), portland cement (50 parts), and 12 parts of a 25% solution of sodium methoxide in methanol is stirred together using a high speed stirrer to give a smooth paint. This is sprayed 1–3 mils thick on rusty steel panels that had been wire brushed to remove loose particles, the brushed surface still having a rusty appearance. within 15 minutes the coating is dry to the touch, and it continues to harden for at least 24 hours. Throughout this curing period the coating remains crack free and continuous, and after 24 hours is tightly adherent to the metal panel. The unused paint was sealed in a metal can. In three months of storage there was no evidence of gas evolution or pressure buildup in the can, and coatings made after that time dried at the same rate as freshly prepared material. After this time period, the coating on the rusty steel was still adhering tenaciously and had not cracked or peeled.

EXAMPLE 2

Ethyl silicate "40" (100 parts), calcium aluminate cement (250 parts), and 10 parts of a 25% solution of sodium methoxide in methanol were stirred using a high speed stirrer. A smooth paint was formed. This was sprayed on wire brushed rusted steel panels in a thickness of 1–3 mils. The coating dries to the touch in 30 minutes without cracking and continues to harden for at least 24 hours as a continuous film with no cracking or checking evident.

EXAMPLE 3

Ethyl silicate "40" (100 parts), portland cement (250 parts) and 10 parts of a 25% solution of sodium methoxide in methanol are stirred using a high speed stirrer to form a smooth paint which is then sprayed onto rusty steel panels that have been lightly wire brushed. The 1–3 mil coating is touch dry in 30 minutes and continues to harden for at least 24 hours. Throughout this time the coating remains crack-free and continuous and after 24 hours is tightly adherent to the metal panel. The coating resists cutting and chipping and is very difficult to detach from the metal substrate. The substrate under the coating shows almost none of the rust that was originally present. After exposure to salt spray for 500 hours, the coated panels show no trace of rusting or film deterioration.

EXAMPLE 4

A mixture of ethyl silicate "40" (100 parts), portland cement (350 parts), butyl Cellosolve (60 parts), and finely powdered potassium hydroxide (three parts) is mixed together in a high speed stirrer to form a smooth paint. This was sprayed onto lightly rusted panels in a wet coating 2–3 mils thick. Within 30 minutes, the coating was touch dry and after 24 hours completely hard, crack-free and tightly adherent.

EXAMPLE 5

A mixture of ethyl silicate "40" (100 parts), portland cement (250 parts) and five parts of dicylohexylamine was stirred in a high speed stirrer to a smooth paint. When applied to lightly rusted panels, the coating was touch dry in 10 minutes and completely hard in 24 hours.

EXAMPLE 6

When the dicyclohexylamine in the above example was replaced by two parts of ethanolamine, the coating was touch dry in one hour and completely hard in 24 hours.

Although all the forgoing has mentioned ethyl silicate as the basis material, this invention is not limited to simply tetraethyl orthosilicate. The same results are obtained with partially polymerized forms of ethyl silicate. These materials are known in commerce as condensed ethyl silicates. In fact, the preferred form of ethyl silicate for this invention is a polymerized product which contains 40% of silica and is known technically as ethyl silicate "40". Furthermore, it is to be understood that the products of this invention are not limited to the simple solutions so far described. In addition to the ethyl silicate, zinc, cement and alkaline catalyst one can add a variety of materials to achieve certain desired purposes. For example, one may add suspending agents such as bentonite clays to help suspend the particulate ingredients, and one may add various inert pigments to color the final coating.

The silicate is normally tetraethoxy silane (ethyl silicate) obtainable commercially generally as a mixture which includes ethyl polysilicates which occur from partial hydrolysis and condensation reactions. While ethyl silicate is preferred, other silicyl esters may be used including other lower alkoxy silanes, aryloxy silanes and aralkoxy silanes such silanes containing methyl, propyl, butyl, ethyl-hexyl, phenyl, benzyl groups, or the like, as desired. Commercially, ethyl silicate is the only important one, and it is obtainable orthosilicate, tetraethyl ortoosilicate, condensed ethyl silicate and ethyl silicate "40", the latter, because of its high silica content, being preferred.

The catalysts used in this invention include sodium methoxide, sodium ethoxide, potassium methoxide, potassium ethoxide, sodium hydroxide and potassium hydroxide, lithium hydroxide and lithium methoxide, lithium ethoxide, lithium isopropoxide, lithium butoxide, as well as the similar alkoxides of sodium and potassium. In practice, sodium methoxide is preferred for its low cost and availability. Solution of the catalysts in the silicate is effected by using a solvent in which the catalyst and the silicate are soluble. Such solvents are the lower alcohols such as methanol, ethanol, propanols and cellosolve. While other solvents can be used, these are cheap and effective materials and are conveniently placed in the anhydrous form needed for the purposes of this invention. While ethyl alcohol is produced as a product during the setting reactions, it is to be appreciated that the intimate contact of the silicate and the catalyst is needed to effect that production and, therefore, solution is effected before the curing is to begin. Thus, solutions of the alkaline catalysts varying in solids content from about 1% to about 30% are used, with a 25% concentration usually being used. Suspension of alkaline catalyst can be effected in a wide variety of solvents such as benzene, toluene, the alcohols named above and the like.

Anhydrous conditions are obtained and maintained in any of the conventional ways. Starting materials, such as methanol and the silicate, are commercially available in anhydrous form. The mixing steps are generally done under a blanket of inert gas. While a number of such gases can be used, dry nitrogen is ordinarily used because of its ready availability and low cost. Further, the packaging art is quite highly developed so that precision and very tight seals are very readily obtained with the result that the probability of leakage and exposure to humid air prior to use is very slight. Thus, the mixtures of this invention usually can be poured into a container and simply sealed. The sealed products have excellent long storage characteristics and can be shipped readily without difficulty.

As already mentioned, these alkali catalyzed mixtures of silicate esters and inorganic fillers are valuable not only for the fact that the anhydrous mixtures are storage stable but also for the fact that they react very rapidly with moisture. For example, under typical summer atmospheric conditions, the coatings of the composition of this invention will dry to the touch in 15 minutes and be completely hard in 2–3 hours while acid catalyzed mixtures of partially hydrolized ethyl silicate will require several hours before they are sensibly hard, and uncatalyzed ethyl silicate by itself will remain fluid for several weeks.

The products of this invention may be used not only in creating protective coatings for all sorts of surfaces, metal and non-metal, but in bonding and in impregnating procedures.

In addition, it is understood that the principles of this invention are not limited to the application of coating to metals; with appropriate fillers and pigments, storage stable but highly reactive compositions can be prepared which show excellent adhesion to ceramics, cement, stone and glass, and such compositions are to be included in the scope of this invention.

While the invention has been disclosed herein in connection with certain embodiments and certain structural and procedural details, it is clear that changes, modifications or equivalents can be used by those skilled in the art; accordingly, such changes within the principles of the invention are intended to be included within the scope of the claims below.

I claim:

1. As a new composition of matter, a mixture of polysilicate ester and, as a moisture reactive filler, a hydraulic cement.

2. A composition in accordance with claim 1 in which said filler is present in amounts of about 25% to about 90% based on the total weight of said mixture.

3. A composition in accordance with claim 2 in which said filler is present in amounts about 50% to about 80% based on the total weight of said mixture.

4. A composition in accordance with claim 1 which also contains zinc as a filler component.

5. A composition in accordance with claim 4 in which said hydraulic cement forms 5 to 25% of the total filler component.

6. A composition in accordance with claim 1 which contains a catalyst chosen from the group consisting of organic amines having a $pK_a$ greater than 7, alkali metal hydroxides, alkali metal alkoxides, alkaline-earth metal hydroxides and alkaline earth metal alkoxides.

7. A composition in accordance with claim 6 which contains about 0.1% to about 10% by weight of said catalyst based on the weight of the said polysilicate ester.

8. A composition in accordance with claim 1 in which said ester is an alkyl polysilicate.

9. A composition in accordance with claim 8 in which said alkyl polysilicate is ethyl silicate.

10. A composition in accordance with claim 1 in which said hydraulic cement is portland cement.

11. A composition in accordance with claim 1 in which said hydraulic cement is calcium aluminate cement.

* * * * *